(12) United States Patent
Kasuga

(10) Patent No.: US 9,654,214 B2
(45) Date of Patent: May 16, 2017

(54) COMMUNICATION SYSTEM

(71) Applicant: FANUC Corporation, Minamitsuru-gun, Yamanashi (JP)

(72) Inventor: Ryosuke Kasuga, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 15/013,036

(22) Filed: Feb. 2, 2016

(65) Prior Publication Data

US 2016/0226588 A1    Aug. 4, 2016

(30) Foreign Application Priority Data

Feb. 3, 2015    (JP) ................ 2015-019675

(51) Int. Cl.
*H04B 10/25*    (2013.01)
*H04B 3/54*    (2006.01)

(52) U.S. Cl.
CPC ............... *H04B 10/25* (2013.01); *H04B 3/54* (2013.01)

(58) Field of Classification Search
CPC .................................. H04B 10/25; H04B 3/54
USPC .......................................................... 398/140
See application file for complete search history.

(56) References Cited

U.S. PATENT DOCUMENTS

| 7,371,014 B2* | 5/2008 | Willis ................ G02B 6/3887 385/24 |
| 8,534,931 B2* | 9/2013 | Miller ..................... G06F 1/32 385/100 |
| 8,824,838 B2* | 9/2014 | Walker ................. G06F 13/385 385/14 |
| 2003/0002108 A1* | 1/2003 | Ames ................ H04B 10/6932 398/139 |
| 2009/0196621 A1* | 8/2009 | Chen ................... G06F 13/4027 398/115 |
| 2014/0186023 A1* | 7/2014 | Louderback ......... H04B 10/077 398/16 |
| 2014/0363173 A1 | 12/2014 | Dave et al. |

FOREIGN PATENT DOCUMENTS

| JP | 2002-305556 A | 10/2002 |
| JP | 2008-097040 A | 4/2008 |

OTHER PUBLICATIONS

Decision to Grant a Patent issued Jan. 10, 2017 in Japanese Patent Application No. 2015-019675 (3 pages) with an English Translation (3 pages).

* cited by examiner

*Primary Examiner* — Dalzid Singh
(74) *Attorney, Agent, or Firm* — Drinker Biddle & Reath LLP

(57) ABSTRACT

A communication system is capable of determining, at a reception side of a communication circuit, whether a communication method connected is of optical communication or electric communication. When the communication system is activated, a communication circuit transmission unit transmits a differential high fixed output. When a communication circuit reception unit receives a differential high fixed signal, it is determined that electric communication is used. When the communication circuit reception unit receives a differential low fixed signal, it is determined that optical communication is used.

4 Claims, 5 Drawing Sheets

_US 9,654,214 B2_

COMMUNICATION SYSTEM

RELATED APPLICATION DATA

This application claims priority under 35 U.S.C. §119 and/or §365 to Japanese Application No. 2015-019675 filed Feb. 3, 2015, the entire contents is incorporated herein by reference.

BACKGROUND OF THE INVENTION

1. Field of the Invention

The present invention relates to a communication system, in particular, to a communication system capable of determining, at a reception side of a communication circuit, whether a communication method connected is of optical communication or electric communication.

2. Description of the Related Art

As communication methods in communications performed via a cable between electronic devices, with which either of an optical signal or an electrical signal can be optionally selected for data transmission, the following methods are available:

(1) a method for connecting an electric communication cable 809 to electric connectors 803, 804 mounted on electronic devices 801, 802, using electric connectors 805, 806, or a method for connecting an optical active cable that performs communication via an optical communication cable 810, using photoelectric conversion circuits incorporated in electric connectors 807, 808 provided at both ends thereof as illustrated in FIG. 8, or.

(2) a method for connecting an electric cable 923 to electric communication modules 915, 916 which can be attached to, and detached from, electric connectors 913, 914 mounted on electronic devices 911, 912, using electric connectors 917, 918, or a method for connecting an optical communication cable 924 to photoelectric conversion modules 919, 920, using optical connectors 921, 922, as illustrated in FIG. 9.

In the method (2) above, a small form-factor pluggable (SFP) module is widely known.

In general, optical communication enables higher-speed and longer-distance communication than electric communication. Furthermore, waveform correction techniques for achieving higher-speed and longer-distance communication with electric communication have been developed although less effective than optical communication, wherein pre-emphasis and de-emphasis, and an equalizer are widely used. If a cable that is connected is known at the side of an electronic device, it is possible to select a communication speed and to determine whether or not to use a waveform correction method, whereby communication optimally utilizing the performance of each cable can be performed.

As a method for informing an electronic device of a selected communication method, electric communication or optical communication, a user may set the selected communication method in an electronic device, or an electronic device may automatically discriminate the selected communication method. Examples of such automatic discrimination by an electronic device include a configuration in which a terminal for discriminating the communication method selected is provided, as disclosed in Japanese Patent Application Laid-Open No. 2008-097040, and a configuration in which a transceiver (electric communication module or photoelectric conversion module) has therein information on corresponding communication standard including information on which of optical communication or electric communication is used and is configured to acquire information by using a dedicated communication path between an electronic device and the transceiver, as in an SFP transceiver.

In case where a system is established in which communication between electronic devices is performed by an inexpensive electric communication in a short-distance communication and a low-speed communication, whereas communication between electronic devices is performed by optical communication in a long-distance communication and high-speed communication, if both of the electronic devices that perform communication know the communication method before the start of communication, it is possible to determine whether or not a technique for correcting a waveform is to be used at the time of electric communication and to select a communication speed. However, adding a specific terminal for discriminating a communication method or a dedicated communication path increases costs. Because it is sufficient that the communication method is known before the start of communication, a terminal for communication used after the start of communication can be temporarily used. Furthermore, for electric communication, connection with AC coupling may be required to eliminate influence of a signal potential difference between electronic devices that perform communication.

SUMMARY OF THE INVENTION

The object of the present invention is to provide a communication system capable of determining, at a reception side of a communication circuit, whether a communication method connected is of optical communication or electric communication without adding a signal terminal for discrimination.

A communication system according to the present invention is a communication system enabling communication between electronic devices with either of an optical communication path including an optical communication cable or an electric communication path including an electric communication cable connected thereto. Each of the electronic devices includes a communication circuit transmission unit that outputs serial data to be transmitted in the form of a differential signal and a communication circuit reception unit that receives a differential signal.

In a communication system according to a first embodiment of the present invention, the optical communication path includes a transmission-side connector and a reception-side connector. The transmission-side connector includes a transmission-side photoelectric conversion circuit that converts the differential signal into an optical signal. The reception-side connector includes a reception-side photoelectric conversion circuit with a signal detection circuit incorporated therein. The reception-side photoelectric conversion circuit converts the received optical signal into an electric signal when the received optical signal includes an AC signal and sets an electric output signal to a high fixed signal or a low fixed signal when the received optical signal does not include an AC signal. The communication circuit transmission unit outputs a high fixed signal or a low fixed signal of differential for determination of communication path when determining a communication path connected thereto. On the other hand, the communication circuit reception unit receives a non-inverted signal of a signal output by the communication circuit transmission unit when the electric communication path is connected, receives an inverted signal of a signal output by the communication circuit transmission unit with the signal detection circuit when the optical communication path is connected, and determines whether the connected communication path is an electric communication path or an optical communication path based on the received signal.

A communication system according to a second embodiment of the present invention includes an electric communication module, a transmission-side photoelectric conversion module, and a reception-side photoelectric conversion module. The electric communication module connects an electric connector provided at both ends of the electric communication path and an electric connector of the electronic device when the electric communication path is connected. The transmission-side photoelectric conversion module includes a transmission-side photoelectric conversion circuit that is connected to a transmission-side optical connector of the optical communication path and converts the differential signal into an optical signal when the optical communication path is connected. The reception-side photoelectric conversion module includes a reception-side photoelectric conversion circuit with a signal detection circuit incorporated therein. The reception-side photoelectric conversion circuit converts the received optical signal into an electric signal when the received optical signal includes an AC signal and sets an electric output signal to a high fixed signal or a low fixed signal when the received optical signal does not include an AC signal. The communication circuit transmission unit outputs a high fixed signal or a low fixed signal of differential for determination of communication path when determining a communication path connected thereto. On the other hand, the communication circuit reception unit receives a non-inverted signal of a signal output by the communication circuit transmission unit when the electric communication path is connected, receives an inverted signal of a signal output by the communication circuit transmission unit with the signal detection circuit when the optical communication path is connected, and determines whether the connected communication path is an electric communication path or an optical communication path based on the received signal.

The communication system may further include a terminal resistor that makes an inverted signal and a non-inverted signal of differential transmission after AC coupling the same potential when no AC signal is present before an input to the communication circuit reception unit and a signal detection circuit that is provided in a rear stage of the terminal resistor and that instructs a circuit in a rear stage, when an inverted signal and a non-inverted signal are in the same potential, to transmit a non-inverted signal of a signal output by the communication circuit transmission unit, indicating that no signal is present, at the time of communication path determination, wherein when an electric communication path is connected, an AC coupling element is incorporated between the communication circuit transmission unit and the communication circuit reception unit.

A communication system according to the present invention is capable of determining, at a reception side of a communication circuit, whether a communication method connected is of optical communication or electric communication, without adding any signal terminal for determination. With the communication system bidirectionally implemented, both of the electronic devices that perform communication can discriminate the communication method. With respect to electric communication, both connection methods of DC coupling and AC coupling can be available.

BRIEF DESCRIPTION OF THE DRAWINGS

The forgoing and other objects and feature of the invention will be apparent from the following description of preferred embodiments of the invention with reference to the accompanying drawings, in which.

DETAILED DESCRIPTION OF THE PREFERRED EMBODIMENTS

According to the present invention, when a system is activated, a differential high fixed output is transmitted from a communication circuit transmission unit and if the differential high fixed output is received by a communication circuit reception unit, then it is determined that an electric communication is used, whereas if a differential low fixed output is received by the communication circuit reception unit, on the other hand, then it is determined that an optical communication is used. It should be noted here that a signal to be transmitted and determination logic of a received signal can be reversed.

Figure 1:
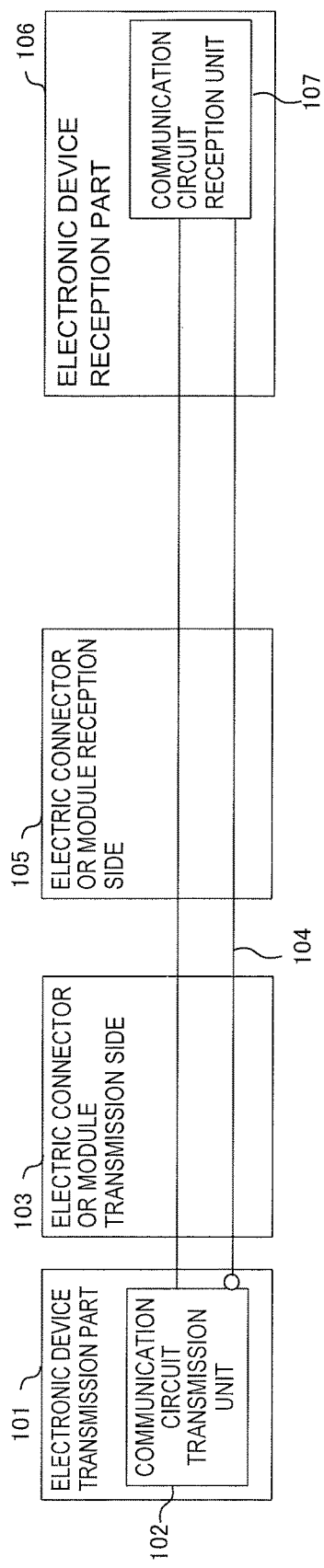
FIG. 1 is a diagram illustrating an example of configuration of electric communication connection at DC coupling in a communication system according to an embodiment of the present invention.

A. When electronic devices are DC-coupled in electric communication, connection in electric communication is illustrated in FIG. 1 and connection in optical communication is illustrated in FIG. 2.

A-1: In electric communication, as illustrated in FIG. 1, a differential high fixed signal output from a communication circuit transmission unit 102 included in an electronic device transmission part 101 reaches a communication circuit reception unit 107 included in an electronic device reception part 106 via an electric connector or a module transmission side 103, an electric communication cable 104, and an electric connector or a module reception side 105, still in the form of differential high fixed signal.

A-2: In optical communication, as illustrated in FIG. 2, a differential high fixed signal output from a communication circuit transmission unit 202 included in an electronic device transmission part 201 is input to an electric connector incorporated in a photoelectric conversion circuit or a module reception side 205 via an electric connector incorporated in a photoelectric conversion circuit or a module transmission side 203 and an optical communication cable 204.

Figure 2:
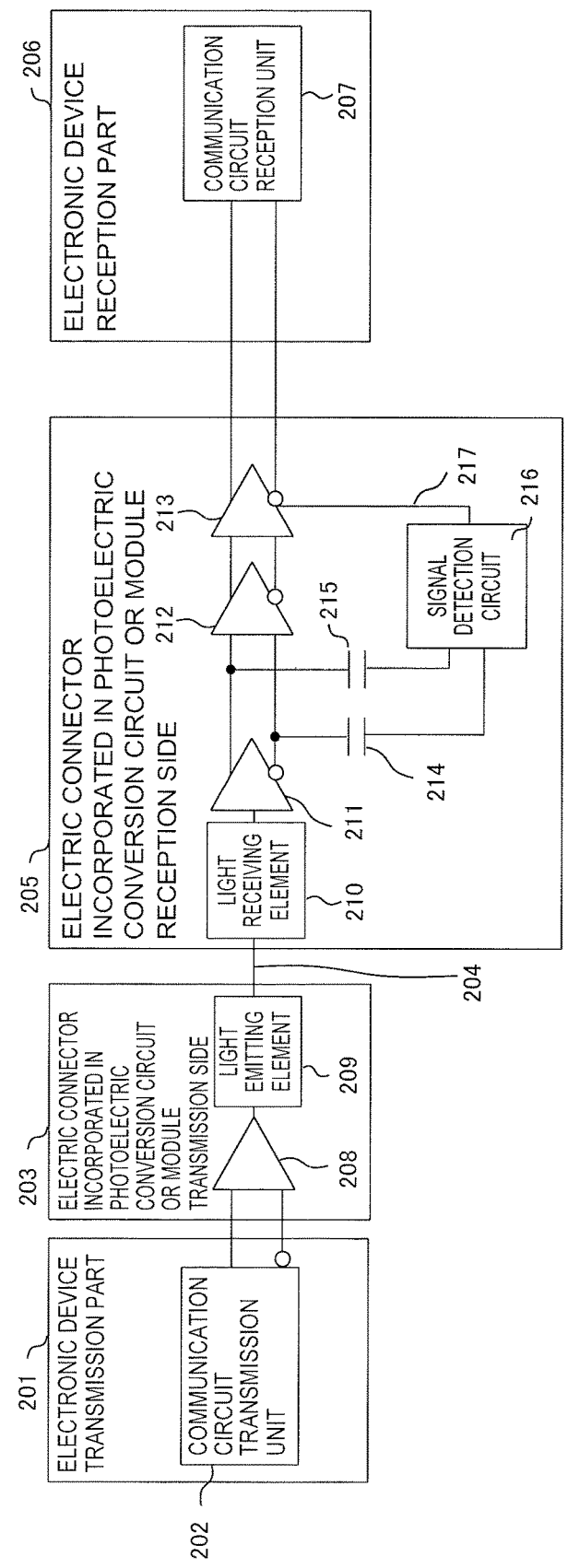
FIG. 2 is a diagram illustrating an example of configuration of optical communication connection at DC coupling in a communication system according to an embodiment of the present invention.

In the electric connector incorporated in a photoelectric conversion circuit or a module reception side 205 in FIG. 2, an optical signal received by a light receiving element 210 is converted into an electric signal and transmitted to differential amplifiers 212, 213 in rear stages via an amplifier 211 as well as branched to be transmitted to AC coupling elements 214, 215. As DC components are cut by the AC coupling elements 214, 215, a signal detection circuit 216 determines that no signal is detected, and an output stop is instructed to the differential amplifier 213 via a signal line 217. An output of the differential amplifier 213 when the output stop is instructed is set to differential low fixed, whereby a differential low fixed signal reaches a communication circuit reception unit 207 included in an electronic device reception part 206.

Figure 3:
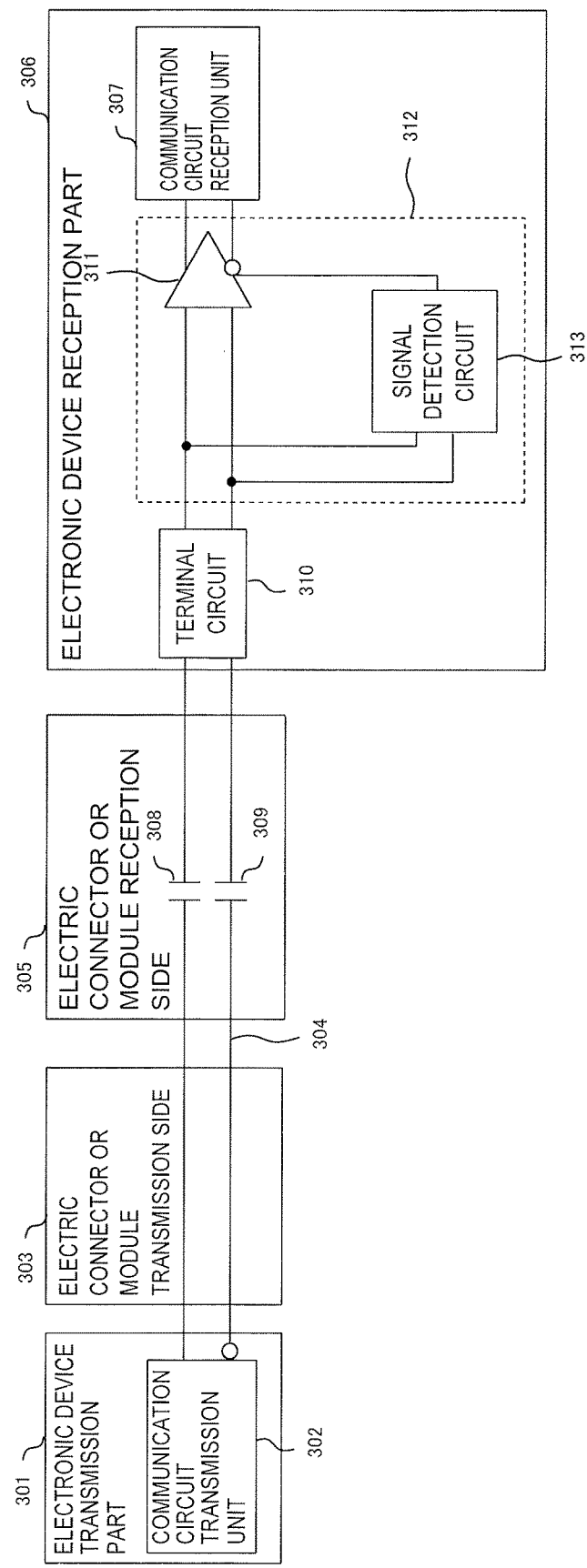
FIG. 3 is a diagram illustrating an example of configuration of electric communication connection at AC coupling in a communication system according to an embodiment of the present invention.
Figure 4:
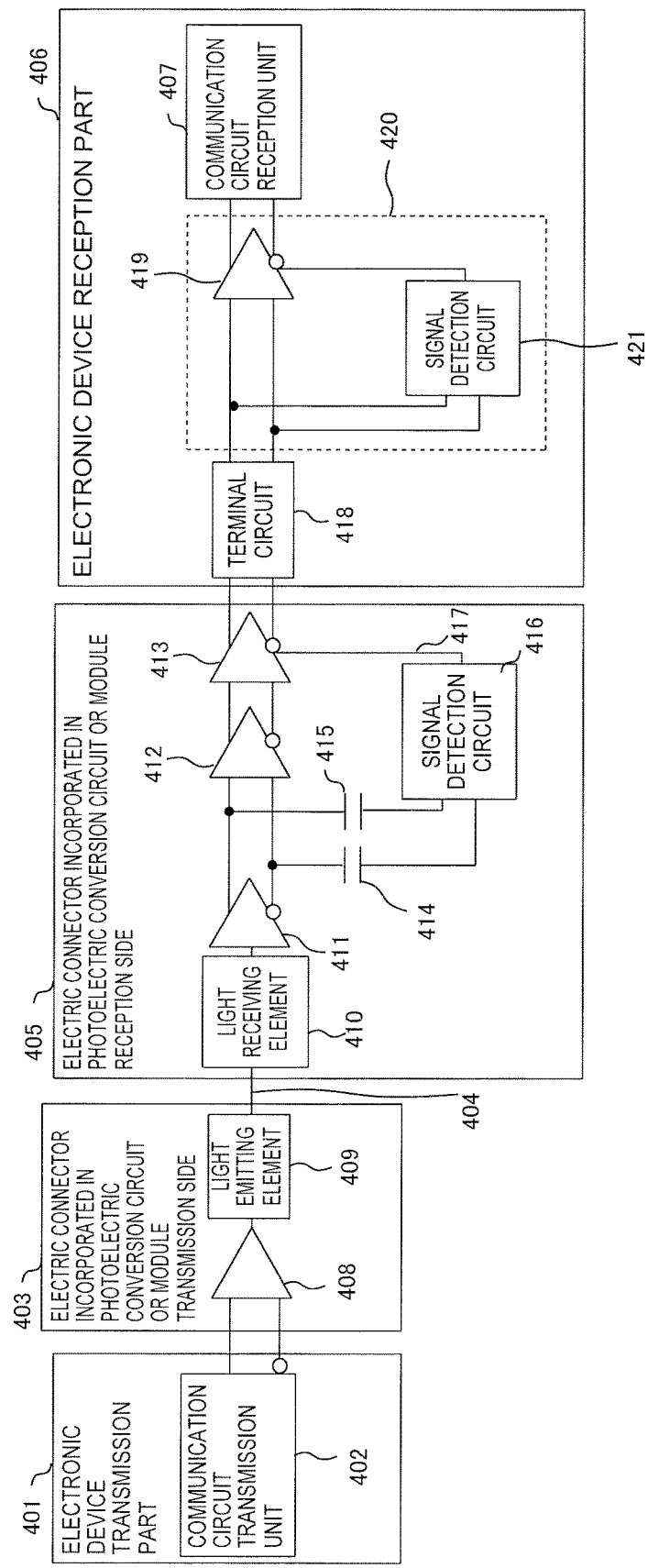
FIG. 4 is a diagram illustrating an example of configuration of optical communication connection at AC coupling in a communication system according to the embodiment of the present invention.

B: When electronic devices are AC-coupled in electric communication, connection in electric communication is illustrated in FIG. 3 and connection in optical communication is illustrated in FIG. 4.

B-1: In electric communication, as illustrated in FIG. 3, a differential high fixed signal output from a communication circuit transmission unit 302 included in an electronic device transmission part 301 is transmitted via an electric connector or a module transmission side 303 and an electric communication cable 304 to an electric connector or a module reception side 305, in which AC coupling elements 308, 309 cut DC components of the differential high fixed signal. An inverted side and a non-inverted side become the same potential by a terminal circuit 310, at a certain potential.

The inverted side and the non-inverted side being at the same potential causes a signal detection circuit 313 to determine that no signal is present and instruct an output stop to a differential amplifier 311. The operation of the differential amplifier 311 at the time of output stop is set to differential high fixed, whereby a differential high fixed signal reaches a communication circuit reception unit 307. It should be noted here that the AC coupling elements 308, 309 may be arranged in any positions between the electric connector or the module transmission side 303 and the electric connector or the module reception side 305.

B-2: In optical communication, as illustrated in FIG. 4, a differential high fixed signal output from a communication circuit transmission unit 402 included in an electronic device transmission part 401 is transmitted to an electric connector incorporated in a photoelectric conversion circuit or a module reception side 405 via an electric connector incorporated in a photoelectric conversion circuit or a module transmission side 403 and an optical communication cable 404.

In the electric connector incorporated in a photoelectric conversion circuit or the module reception side 405 in FIG. 4, an optical signal received by a light receiving element 410 is converted into an electric signal and transmitted to differential amplifiers 412, 413 in rear stages via an amplifier 411 as well as branched to be transmitted to AC coupling elements 414, 415. As DC components are cut by the AC coupling elements 414, 415, a signal detection circuit 416 determines that no signal is detected, and an output stop is instructed to the differential amplifier 413 via a signal line 417. An output of the differential amplifier 413 when the output stop is instructed is set to differential low fixed, whereby a differential low fixed signal reaches an electronic device reception part 406. In the electronic device reception part 406, the differential low fixed signal is branched to reach a signal detection circuit 421 via a terminal circuit 418. The differential low fixed signal causes the signal detection circuit 421 to determine that a signal is present, and is thus transmitted to a communication circuit reception unit 407 via a differential amplifier 419, still in the form of the differential low fixed signal.

Functions corresponding to the signal detection circuits 216, 313, 416, 421 are generally implemented in an SFP module or the like in the names of Signal Detect (SD) and Loss of Signal (LOS), for example, and used for detecting that no optical signal reaches a photoelectric conversion circuit. Signal detection circuits having a function to stop a reception output in accordance with a signal detection result are disclosed in Japanese Patent Application Laid-Open No. 2009-044228 and Japanese Patent Application Laid-Open No. 2007-005968, for example.

Figure 5:
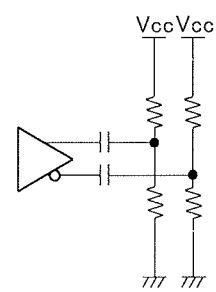
FIG. 5 is a diagram illustrating an example of a positive emitter coupled logic (PECL) terminal circuit.
Figure 6:
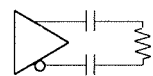
FIG. 6 is a diagram illustrating an example of a low voltage differential signaling (LVDS) terminal circuit.
Figure 7:
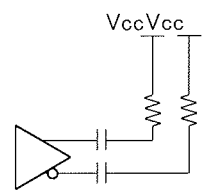
FIG. 7 is a diagram illustrating an example of a current mode logic (CML) terminal circuit.
Figure 8:
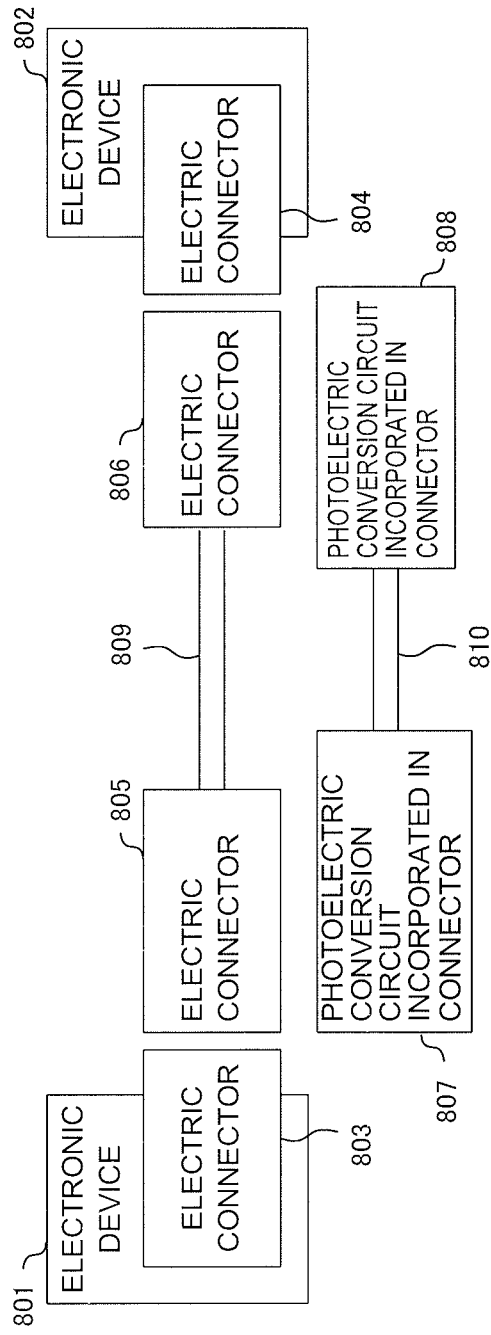
FIG. 8 is a diagram explaining a first example of a communication system according to prior art technique, which is capable of selecting between optical signal communication and electric signal communication.
Figure 9:
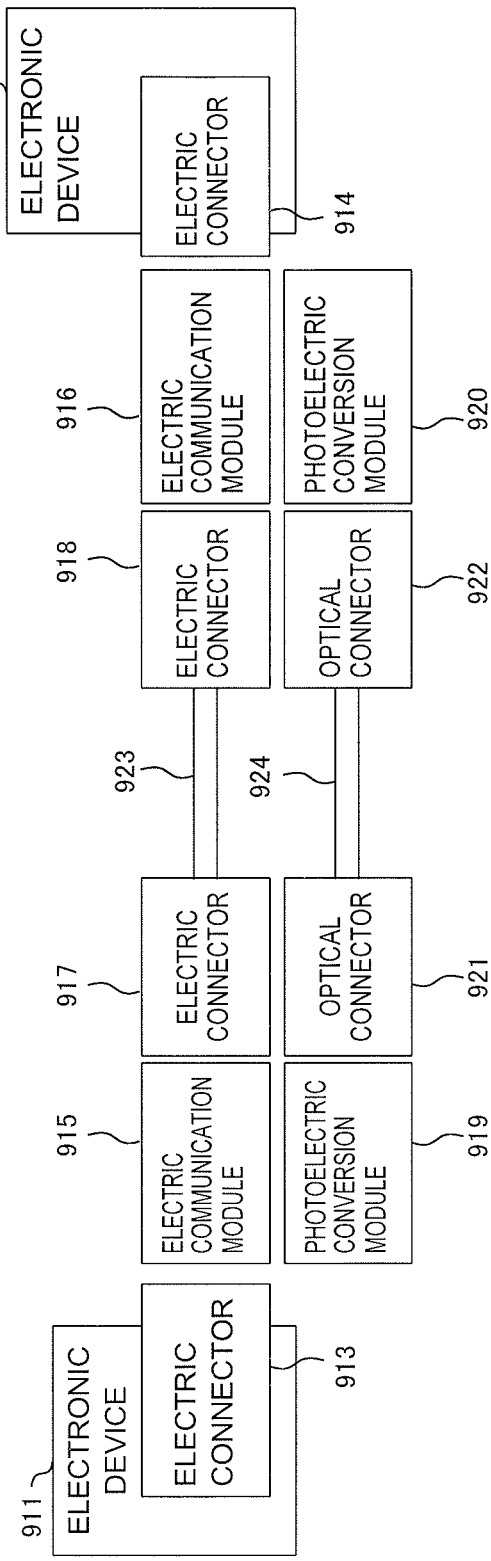
FIG. 9 is a diagram explaining a second example of a communication system according to prior art technique, which is capable of selecting between optical signal communication and electric signal communication.

In addition, as the terminal circuits 310, 418, PECL (FIG. 5), LVDS (FIG. 6), CML (FIG. 7) circuits and the like are available, in each of which when no AC component is present in an input signal, a positive side and a negative side of differential after AC coupling become the same potential.

The embodiments of the present invention has been described above, however, the present invention is not limited to the examples described in the embodiments above and may be implemented in various forms by adding modification as appropriate.

The invention claimed is:

1. A communication system enabling communication between electronic devices with either of an optical communication path including an optical communication cable or an electric communication path including an electric communication cable connected thereto, wherein
    the electronic devices that perform communication each include:
        a communication circuit transmission unit that outputs serial data to be transmitted in the form of a differential signal; and
        a communication circuit reception unit that receives a differential signal, and wherein
    the optical communication path includes:
        a transmission-side connector that includes a transmission-side photoelectric conversion circuit that converts the differential signal into an optical signal; and
        a reception-side connector that includes a reception-side photoelectric conversion circuit with a signal detection circuit incorporated therein, the reception-side photoelectric conversion circuit converting the received optical signal into an electric signal when the received optical signal includes an AC signal and setting an electric output signal to a high fixed signal or a low fixed signal when the received optical signal does not include an AC signal, wherein
    the communication circuit transmission unit outputs a high fixed signal or a low fixed signal of differential for determination of communication path when determining a communication path connected thereto, and
    the communication circuit reception unit receives a non-inverted signal of a signal output by the communication circuit transmission unit when the electric communication path is connected, receives an inverted signal of a signal output by the communication circuit transmission unit with the signal detection circuit when the optical communication path is connected, and determines whether the connected communication path is an electric communication path or an optical communication path based on the received signal.

2. The communication system according to claim 1, further comprising:

a terminal resistor that makes an inverted signal and a non-inverted signal of differential transmission after AC coupling the same potential when no AC signal is present before an input to the communication circuit reception unit; and a signal detection circuit that is provided in a rear stage of the terminal resistor and that instructs a circuit in a rear stage, when an inverted signal and a non-inverted signal are in the same potential, to transmit a non-inverted signal of a signal output by the communication circuit transmission unit, indicating that no signal is present, at the time of communication path determination, wherein when an electric communication path is connected, an AC coupling element is incorporated between the communication circuit transmission unit and the communication circuit reception unit.

3. A communication system enabling communication between electronic devices with either of an optical communication path including an optical communication cable or an electric communication path including an electric communication cable connected thereto, wherein the electronic devices that perform communication each include:

a communication circuit transmission unit that outputs serial data to be transmitted in the form of a differential signal; and a communication circuit reception unit that receives a differential signal, and wherein the electronic devices further include:

an electric communication module that connects an electric connector provided at both ends of the electric communication path and an electric connector of the electronic device when the electric communication path is connected;

a transmission-side photoelectric conversion module that includes a transmission-side photoelectric conversion circuit that is connected to a transmission-side optical connector of the optical communication path and converts the differential signal into an optical signal when the optical communication path is connected; and a reception-side photoelectric conversion module that includes a reception-side photoelectric conversion circuit with a signal detection circuit incorporated therein, the reception-side photoelectric conversion circuit converting the received optical signal into an electric signal when the received optical signal includes an AC signal and setting an electric output signal to a high fixed signal or a low fixed signal when the received optical signal does not include an AC signal, wherein the communication circuit transmission unit outputs a high fixed signal or a low fixed signal of differential for determination of communication path when determining a communication path connected thereto, and the communication circuit reception unit receives a non-inverted signal of a signal output by the communication circuit transmission unit when the electric communication path is connected, receives an inverted signal of a signal output by the communication circuit transmission unit with the signal detection circuit when the optical communication path is connected, and determines whether the connected communication path is an electric communication path or an optical communication path based on the received signal.

4. The communication system according to claim 3, further comprising:

a terminal resistor that makes an inverted signal and a non-inverted signal of differential transmission after AC coupling the same potential when no AC signal is present before an input to the communication circuit reception unit; and a signal detection circuit that is provided in a rear stage of the terminal resistor and that instructs a circuit in a rear stage, when an inverted signal and a non-inverted signal are in the same potential, to transmit a non-inverted signal of a signal output by the communication circuit transmission unit, indicating that no signal is present, at the time of communication path determination, wherein when an electric communication path is connected, an AC coupling element is incorporated between the communication circuit transmission unit and the communication circuit reception unit.

* * * * *